United States Patent [19]

Gochenouer

[11] Patent Number: 5,622,392
[45] Date of Patent: Apr. 22, 1997

[54] PANEL MOUNTED FEED THROUGH CONNECTOR ASSEMBLY

[75] Inventor: Frederick C. Gochenouer, Mechanicsburg, Ohio

[73] Assignee: Q₃JMC, Inc., Urbana, Ohio

[21] Appl. No.: 491,165

[22] Filed: Jun. 16, 1995

[51] Int. Cl.⁶ .................................................. F16L 37/00
[52] U.S. Cl. ...................... 285/137.1; 285/209; 285/913; 285/330; 411/553
[58] Field of Search ................... 285/209, 137.1, 285/202, 208, 401, 402, 913, 330; 411/553, 552, 551, 549

[56] References Cited

U.S. PATENT DOCUMENTS

| | | |
|---|---|---|
| 790,685 | 5/1905 | Hendricks . |
| 1,126,058 | 1/1915 | Moore ........................ 285/209 |
| 1,131,399 | 3/1915 | McGinley .................... 411/549 |
| 1,319,124 | 10/1919 | Stewart ........................ 285/209 |
| 2,334,681 | 11/1943 | Murphy ........................ 411/553 |
| 2,496,928 | 2/1950 | Bing et al. .................... 285/402 |
| 2,714,754 | 8/1955 | Knohl .......................... 411/553 |
| 3,009,719 | 11/1961 | Otto et al. .................... 411/553 |
| 3,650,551 | 3/1972 | Akers .......................... 285/209 |
| 3,879,066 | 4/1975 | Kozinski ...................... 285/69 |
| 4,133,560 | 1/1979 | Ishikawa et al. ............ 285/209 |
| 4,402,534 | 9/1983 | Keenan ........................ 285/69 |
| 4,449,737 | 5/1984 | Specht ......................... 285/7 |
| 4,893,845 | 1/1990 | Bartholomew ............. 285/137.1 |
| 5,230,539 | 7/1993 | Olson .......................... 285/243 |

FOREIGN PATENT DOCUMENTS 642497  9/1950  United Kingdom ................. 411/553

*Primary Examiner*—Eric K. Nicholson
*Attorney, Agent, or Firm*—Biebel & French

[57] ABSTRACT

A panel mounted feed-through connector assembly for interconnecting flexible pneumatic hose lines, such as used on air brakes for trucks and other vehicles, has a rigid plate with a plurality of apertures, and a separate and removable feed-through connector is formed with a tubular sleeve and is formed with tabs with interfit with projections formed on the rigid plate so that the connector may be twisted and locked into position. Mutual detents formed on the plate and on the connector cooperate to interlock the connector with the plate.

5 Claims, 3 Drawing Sheets

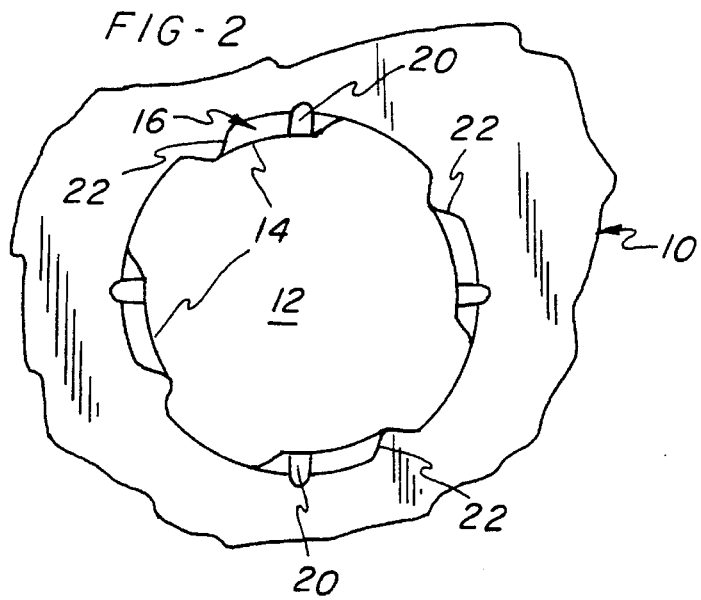
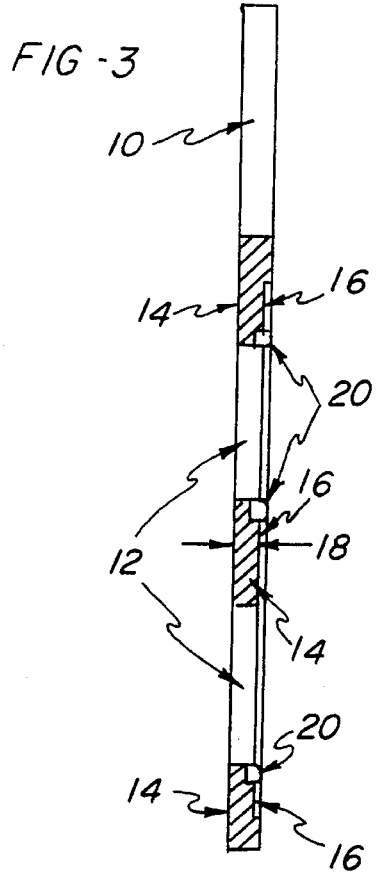
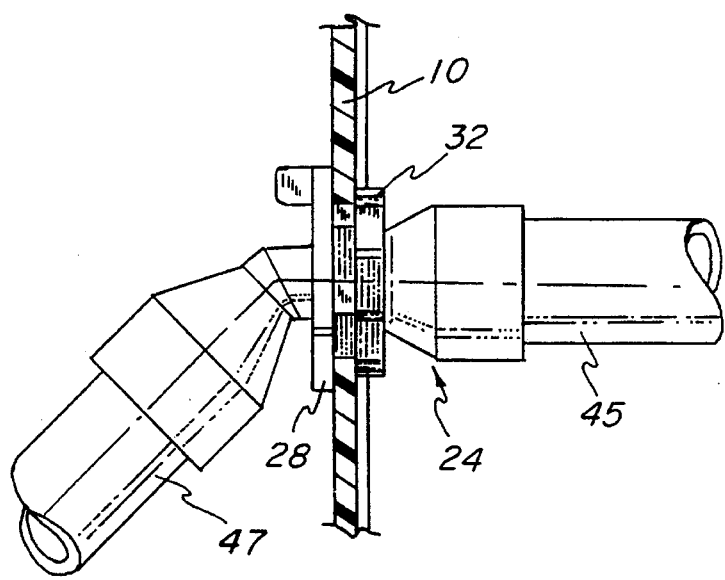

PANEL MOUNTED FEED THROUGH CONNECTOR ASSEMBLY

BACKGROUND OF THE INVENTION

This invention relates to panel mounted feed through connector assemblies which are particularly adapted for interconnecting flexible pneumatic hose lines such as used to operate air brakes and the like in trucks and semi-trailers, and more particularly to such a panel mounted connector assembly which provides for the support and coupling of the ends of a plurality of a flexible pneumatic pressure lines.

The invention was developed in response to the expensive and problematic use of existing threaded brass compression and connector assemblies now in use in vehicle pneumatic brake and air systems.

In some industries, the use of air lines in vehicle subsystems is substantial. Pneumatic or pressurized air is used to control braking functions, air horns and pneumatically operated cab seats. The transmission of this pneumatic air throughout a vehicle is problematical, however. Truck and vehicle manufacturers typically utilize threaded brass compression assemblies for connections between pneumatic flexible lines. One threaded brass compression assembly typically joins several flexible pneumatic lines.

Such brass assemblies are expensive and tend to leak. Typically, if a leak develops in a pressure seal, the entire assembly must be disassembled to find and repair the leak. Haphazard running of the pneumatic lines and location and support of threaded brass compression assemblies also causes leaks and difficult servicing. Time consuming leak testing and replacement of metal pressure line connections result in expensive down time and warranty claims.

SUMMARY OF THE INVENTION

This invention eliminates many of the problems associated with threaded brass compression assemblies. The elimination of brass threads for cheaper molded plastic in the vehicle's pneumatic brake and air subsystems saves money. The apparatus of this invention collects multiple pneumatic lines, such as brake lines, at a single plate, utilizing individual feed through feed through interconnects. The separate connection of such pneumatic air hoses at a centralized mounting plate, using a removable feed through interconnect, simplifies leak detection and servicing. All the potential pressure seal leaks are thus localized for easy testing and disassembly of an entire threaded brass assembly is no longer required simply to leak check one fitting. This saves time and money in leak detection and servicing.

The assembly of this invention has the advantage of providing a single panel-mounted location for removably supporting a plurality of pneumatic feed through connectors, in which an integral injection molded plastic connector housing extends through and is bayonet-coupled to a support plate. In this manner, a plurality of pneumatic connections may be made at one assembly, thereby reducing clutter and at the same time reducing the cost of inspection and maintenance.

It is accordingly an important object of the invention to provide a feed through connector assembly which includes a rigid plate with a plurality of specially configured apertures, and a corresponding plurality of feed through connectors which may be removably matingly received within such apertures, in which the connectors include provision for receiving the remote ends of a pair of flexible pneumatic tubes or lines.

A further object of the invention is to provide a panel mounted connector assembly, as outlined above, in which a plurality of injection molded plastic feed through connectors, particularly adapted to provide feed through connection for flexible pneumatic lines, are removably mounted on a common rigid panel, the latter being adapted for mounting on a vehicle fire wall of the like.

These and other objects and advantages of the invention will be apparent from the following description, the accompanying drawings and the appended claims.

BRIEF DESCRIPTION OF THE DRAWINGS

FIG. 2 is an enlarged drawing of one of the apertures in the plate of FIG. 1, in which the inwardly projecting flanges and mating surfaces are shown, and on which a feed through connector may be removably interlocked.

FIG. 3 is a cross-section of the plate of FIG. 1, looking along line 3—3 of FIG. 1 and showing the relative thicknesses of the inwardly projecting flanges and mating surfaces.

FIG. 4 is an elevational view of the feed through connector removably interlocked in the plate of FIG. 1.

DETAILED DESCRIPTION OF THE PREFERRED EMBODIMENT

Figure 1:
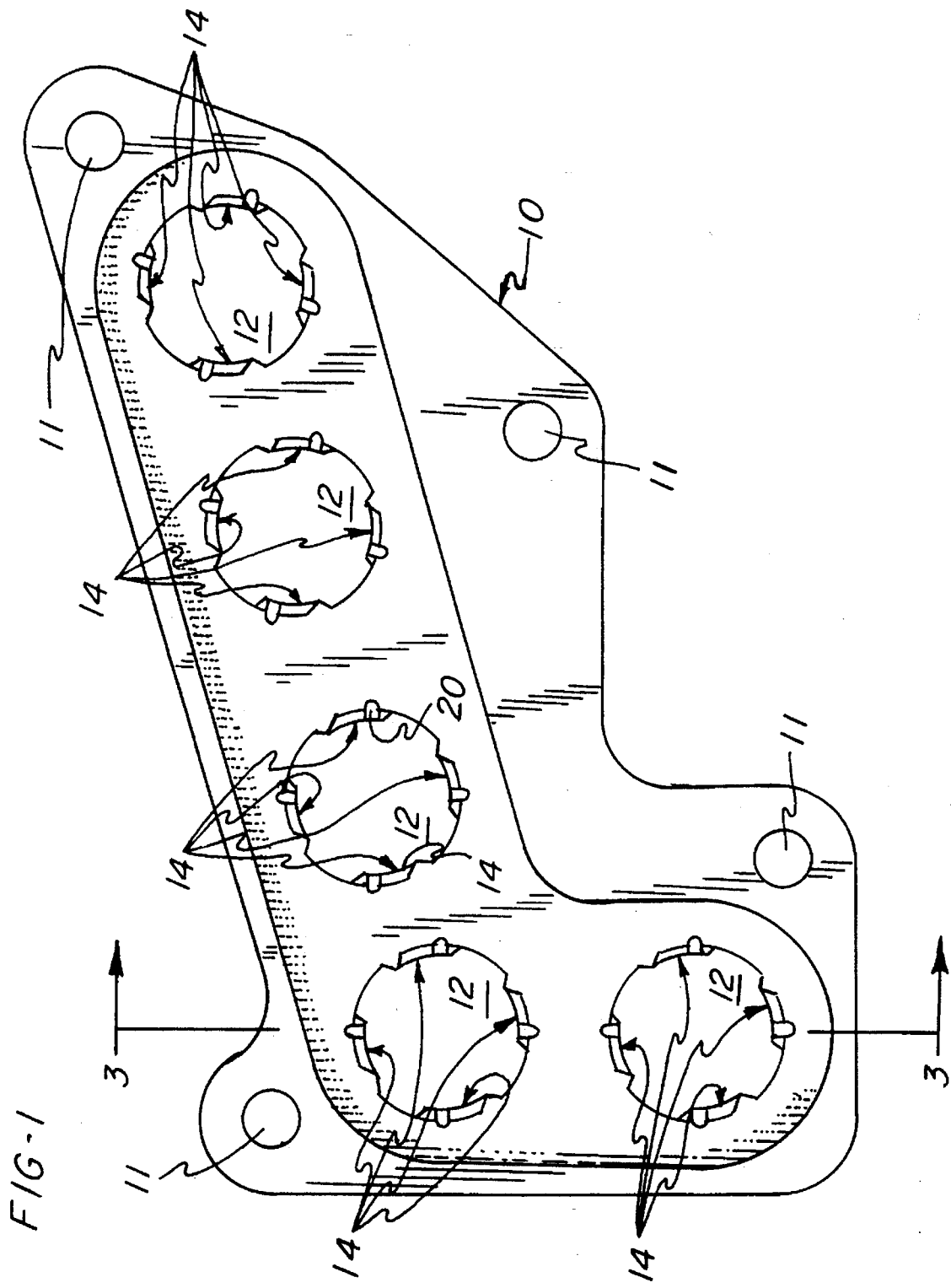
FIG. 1 is a front view of a rigid plate for removably interlocking a feed through connector.

Referring first to FIG. 1, the assembly includes a rigid plate 10, particularly adapted to be mounted on a panel or wall structure of a motor vehicle, such as on the fire wall of a tractor or truck with fasteners such as by screws through the mounting holes 11. The plate may be composed of the same material as the injection molded plastic connector housing and is provided with a plurality of identical spaced apart apertures 12.

Each aperture 12 has a plurality of circumferentially or arcuately equally spaced inwardly projecting flanges 14. Four flanges are shown at 90° spacing. As shown in FIG. 2, each inwardly projecting flange 14 has a circumferentially extending radial mating surface 16 having a thickness 18 (FIG. 3) less than the thickness of the plate 10. Each mating surface 16 has a detent 20 formed therein adjacent one arcuate end of the surface 16. Each inwardly projecting flange 14 also has a stop surface 22 adjacent the detent 20 and defining the terminal end of the inwardly projecting flange 14 and mating surface 16.

Figure 5:
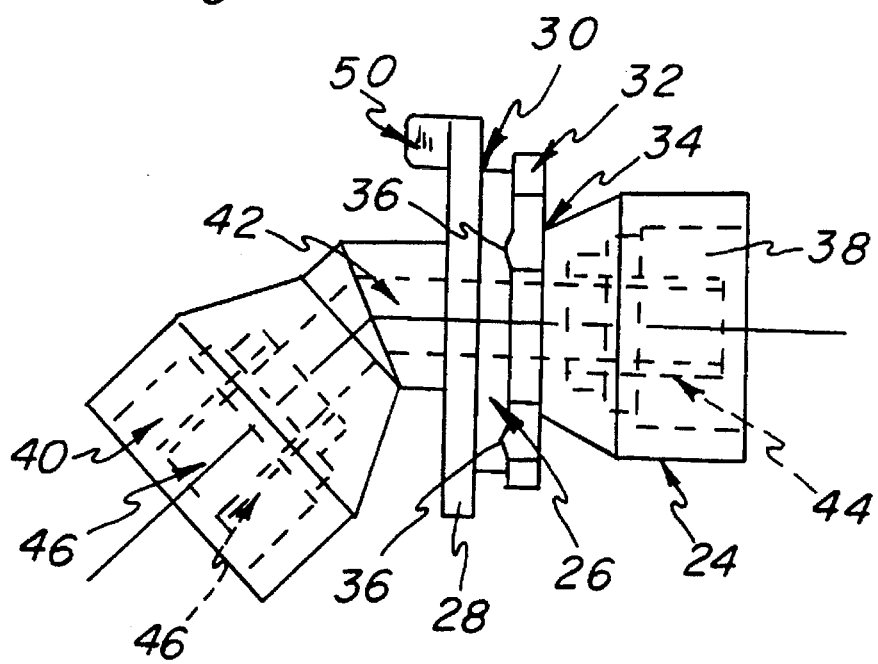
FIG. 5 is a side elevation of a feed through connector according to this invention.
Figure 6:
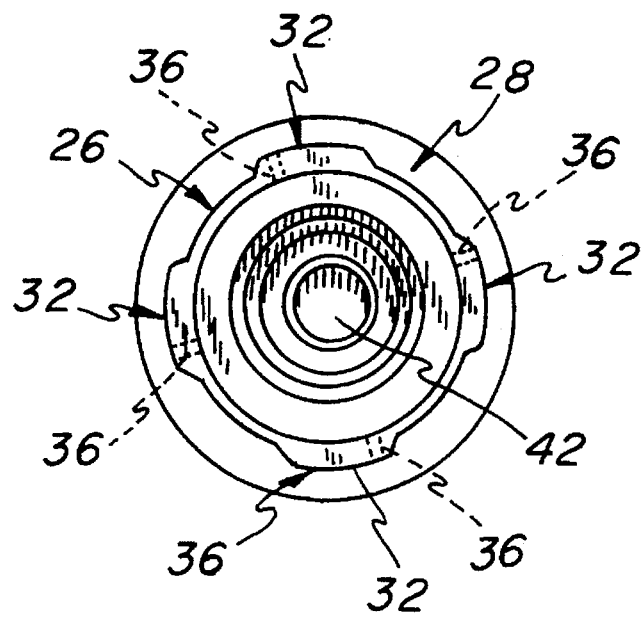
FIG. 6 is an end view of the feed through connector of FIG. 5.

The connector assembly of this invention includes a plurality of molded plastic feed through connectors 24 as shown in FIGS. 5 and 6.

The feed through connector 24 is formed with an external and generally centrally located tubular sleeve 26. The tubular sleeve 26 has an annular wall flange 28 extending radially outward from a first end 30 to prevent over-insertion into the aperture 12. The tubular sleeve 26 also has a plurality of tabs 32 (FIG. 6) extending outward from a second end 34. The tabs 32 have a radius less then the wall flange 28 which allow insertion of the tabs 32 into the aperture 12. The axial spacing between the plurality of tabs 32 and the wall flange 28 approximates the thickness of the inwardly projecting flanges 14 (FIG. 3).

An inlet receiving means 44 connects a flexible pneumatic supply hose 45 to the feed through connector at an inlet passage 38. An outlet receiving means 46 connects another flexible pneumatic outlet hose 47 at an outlet passage 40. An interiorly disposed passageway 42 communicates with the inlet and outlet passages 38, 40.

The feature connector 24, as well as the plate 10, may be molded in a rigid plastic material which has high strength, low creep and low shrinkage. The preferred material is a 12% glass-filled nylon 6, such as Kapron-8231G.HS as manufactured by Allied Signal Inc., Engineered Materials Division, Morristown, N.J. 07962. The passage 42 therethrough may be straight or formed with a bend so that, as shown, the outlet receiving means 46 is somewhat axially offset, such as through about 45°, from the inlet receiving means 44.

Each of the receiving means ends 44 and 46 of the connector 24 includes an interior mechanism, not shown, by means of which the flexible pneumatic hose may be pressed home in position and pneumatically sealed and locked in place, in one or the other end of the connector 24. The inlet and outlet receiving means may consist of the self-gripping quick connect tube coupling of the kind shown in the Olson, U.S. Pat. No. 5,230,539 issued Jul. 27, 1993, the disclosure of which is incorporated by reference. Alternatively, other equally suitable push-to-connect couplings or adapters may be used as known in the art.

Referring to FIG. 5, each of the tabs 32 on its inner radial face has a raised detent 36 thereon on the side of the tab facing the flange 28. The detent 36 is proportioned to cooperate with the detent recesses 20 in the mating surface 16 (FIG. 2) for removably interlocking the feed through connector 24 (FIG. 5) with the plate 10 (FIG. 1) as shown in FIG. 4. The plurality of tabs 32 are prevented from over-rotation by the stop surface 22 on the inwardly projecting flanges 14 (FIG. 2).

The apparatus operates as follows: A feed through connector 24 is inserted into an aperture 12. The plurality of tabs 32 on the feed through connector 24 passes through the aperture 12. The wall flange 28 on the feed through connector 24 prevents the over-insertion of the feed through connector 24. The feed through connector 24 is then rotated, allowing the plurality of tabs 32 to slide into contact with the mating surfaces 16 on the inwardly projecting flanges 14 as shown in FIG. 4. Rotation is assisted by the thumb tab 50. As the plurality of tabs 32 are rotated onto the mating surface 16, the raised detent 36 on each tab 32 slides into its corresponding detent recess 20 on the mating surface 16 to lock the feed through connector 24 in place. The stop surfaces 22 on the far end of the inwardly projecting flanges 14 prevent over-rotation of the feed through connector tabs 32.

The flexible pneumatic hoses 45 and 47 (FIG. 4) may then be pushed into the appropriate tube receiving means within the opposite ends of the connector 24, and the pneumatic line is then provided with continuity by reason of the interconnecting passageway 42. The pneumatic lines are held in a rigid predetermined relation to each other and to a fire wall or other support on which the plate 10 may be mounted. When it is desired to service any particular line or component, it is a simple matter to remove the connector 24 by twisting counterclockwise, when viewed from the side incorporating the thumb tab 50 and replacing the same by inserting the connector 24 within the opening 12 of the plate 10, and twisting the same in the clockwise direction until the detents 36 mate with the detent recesses 20.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A panel mounted feed through connector assembly particularly adapted to be mounted on a panel or wall structure of a motor vehicle such as on the fire wall of a tractor or truck, providing for the support and coupling of the ends of a plurality of flexible pneumatic pressure lines for the vehicle's air brakes, comprising:

a rigid plate having a plurality of apertures, each of said apertures having a plurality of circumferentially-spaced inwardly projecting flanges with each of said inwardly projecting flanges having a circumferentially extending mating surface and having a thickness less than that of said rigid plate and having a detent recess with a thickness less than said mating surface, and said inwardly projecting flange having a stop surface defining an end of said inwardly projecting flange; and a feed through connector with an internally disposed cavity for conduction therethrough of pneumatic pressure with receiving means at each remote end for receiving an end of a said flexible pneumatic pressure line, and said feed through connector formed with a generally tubular sleeve, said tubular sleeve having a wall flange extending radially outward from a first end of said tubular sleeve and a plurality of tabs extending radially outward from a second end of said tubular sleeve, said plurality of tabs having a radius less than said wall flange with the inner distance between said plurality of tabs and said wall flange approximately equal to the thickness of said inwardly projecting flanges and each of said tabs having a raised detent to cooperate with said detent recesses for removably interlocking said feed through connector with said plate.

2. A panel mounted feed through connector assembly particularly adapted to be mounted on a panel or wall structure of a motor vehicle, providing for the support and coupling of the ends of a plurality of pneumatic pressure lines, comprising:

a rigid plate having a plurality of apertures, each of said apertures having a plurality of circumferentially-spaced projecting flanges with each of said projecting flanges having a detent recess; and a feed through connector with conduction means for conduction therethrough of pneumatic pressure, with receiving means at each remote end for receiving an end of a said pneumatic pressure line, and such feed through connector generally formed with a tubular sleeve, said tubular sleeve having a wall flange extending radially outward from a first end of said tubular sleeve and a plurality of tabs extending radially outward from a second end of said tubular sleeve, with the inner distance between said plurality of tabs and said wall flange approximately equal to the thickness of said projecting flanges, each of said tabs having a raised detent to cooperate with said detent recesses for removably interlocking said feed through connector with said plate.

3. A panel mounted feed through connector assembly according to claim 2, wherein:

said conduction means comprises an interiorly disposed inlet passage for connection to a pneumatic supply hose, an interiorly disposed outlet passage for connection to a pneumatic outlet hose, and an interiorly disposed passageway communicating with an inlet passage and an outlet passage.

4. A panel mounted feed through connector apparatus comprising:

a rigid plate with a plurality of flanged apertures with each of said flanged apertures having a plurality of detent elements; and a feed through connector extending from one side of one of said apertures through to the other side of said one aperture and removably interlocked to said rigid plate;

said feed through connector formed with a tubular sleeve having a wall flange extending radially outward from a first end of said tubular sleeve for preventing over-insertion into said one flanged aperture;

a plurality of tabs extending radially outward from a second end of said tubular sleeve to pass through and removably interlock with said flanged aperture; and each of said tabs includes a detent element on the interior of said tabs adjacent to said wall flange positioned to cooperate with and interlock with said detent elements on said rigid plate when interlocked with said rigid plate.

5. A panel mounted pneumatic pressure feed through connector apparatus comprising:

a rigid plate with a plurality of identical flanged apertures with each of said flanged apertures having a plurality of detent elements; and a feed through connector extending from one side of one of said apertures through to the other side of said one aperture and removably interlocked to said rigid plate;

said feed through connector formed with a tubular sleeve having a wall flange extending radially outward from a first end of said tubular sleeve for preventing over-insertion into said flanged aperture;

a plurality of tabs extending radially outward from a second end of said tubular sleeve to pass through and removably interlock with said one flanged aperture at said detent elements;

said feed through connector including an interiorly disposed inlet passage for connection to an end of a pneumatic supply hose, an interiorly disposed outlet passage for connection to an end of a pneumatic outlet hose, and an interiorly disposed passageway communicating with said inlet passage and said outlet passage;

said inlet passage including a quick disconnect for receipt of the end of such pneumatic supply hose; and said outlet passage including a second quick disconnect for receipt of the end of such pneumatic outlet hose.

* * * * *